United States Patent
Chandler

(10) Patent No.: US 7,372,398 B2
(45) Date of Patent: May 13, 2008

(54) ELECTRONIC TARGET POSITION CONTROL AT MILLIMETER WAVE FOR HARDWARE-IN-THE-LOOP APPLICATIONS

(75) Inventor: Cole A. Chandler, Weatherford, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 303 days.

(21) Appl. No.: 11/333,584

(22) Filed: Jan. 17, 2006

(65) Prior Publication Data

US 2008/0088501 A1    Apr. 17, 2008

(51) Int. Cl.
*G01S 7/40* (2006.01)
*G01S 13/00* (2006.01)

(52) U.S. Cl. .............. 342/170; 342/42; 342/43; 342/51; 342/165; 342/169; 342/175

(58) Field of Classification Search .......... 434/2–10; 342/1–19, 165–175, 195, 147, 149–158, 342/73–75, 80, 42–51; 343/703, 772, 786
See application file for complete search history.

(56) References Cited

U.S. PATENT DOCUMENTS

| | | | | |
|---|---|---|---|---|
| 2,914,765 A | * | 11/1959 | Hutchins | 342/171 |
| 2,942,257 A | * | 6/1960 | Huntington | 342/165 |
| 3,018,478 A | * | 1/1962 | Skillman et al. | 342/171 |
| 3,060,424 A | * | 10/1962 | Hansen | 342/169 |
| 3,103,010 A | * | 9/1963 | Heyser et al. | 342/171 |
| 3,110,026 A | * | 11/1963 | Barbour, Jr. et al. | 342/172 |
| 3,138,797 A | * | 6/1964 | Steinberg | 342/171 |
| 3,164,835 A | * | 1/1965 | Alsberg | 342/169 |
| 3,254,340 A | * | 5/1966 | Sealander | 342/169 |
| 3,295,130 A | * | 12/1966 | Prestwood | 342/165 |
| 3,329,953 A | * | 7/1967 | Adams et al. | 342/171 |
| 3,365,719 A | * | 1/1968 | Williams | 342/171 |
| 3,665,616 A | * | 5/1972 | Basard et al. | 434/2 |
| 3,760,418 A | * | 9/1973 | Cash et al. | 342/6 |
| 3,778,830 A | * | 12/1973 | Joseph | 342/149 |
| 3,924,341 A | * | 12/1975 | Edelsohn | 342/171 |
| 3,982,244 A | * | 9/1976 | Ward et al. | 342/169 |
| 4,106,345 A | | 8/1978 | Saunders et al. | |

(Continued)

*Primary Examiner*—Bernarr E. Gregory
(74) *Attorney, Agent, or Firm*—Williams, Morgan & Amerson, P.C.

(57) ABSTRACT

An apparatus for use in controlling a simulated target position in a millimeter wave, hardware-in-the-loop system includes a pair of horns and a conditioning circuit. The conditioning circuit is capable of generating a pair of output millimeter wave signals, each to be broadcast from a respective one of the horns, the output millimeter wave signals being out of phase by a predetermined amount, and capable of attenuating at least one of the output millimeter wave signals to control the position of the simulated target in a first and a second region. A method for use in controlling a simulated target position in a millimeter wave, hardware-in-the-loop system includes generating a pair of output millimeter wave signals that are out of phase by a predetermined amount; attenuating at least one of the output millimeter wave signals to control the position of the simulated target in a first and a second region; and broadcasting the millimeter wave signals. The method and apparatus can be extended to four horns arranged in a quad configuration to control position in two dimensions and can be extended to a test array comprising a plurality of horn pairs and horn quads.

25 Claims, 3 Drawing Sheets

U.S. PATENT DOCUMENTS

| | | | |
|---|---|---|---|
| 4,454,513 A | 6/1984 | Russell | |
| 4,467,327 A * | 8/1984 | Drake et al. | 342/172 |
| 4,521,780 A | 6/1985 | Preikschat | |
| 4,560,987 A | 12/1985 | Dochow et al. | |
| 4,621,265 A | 11/1986 | Buse et al. | 342/169 |
| 4,630,053 A | 12/1986 | Green, Jr. et al. | 342/376 |
| 4,660,041 A * | 4/1987 | Maples et al. | 342/170 |
| 4,686,534 A * | 8/1987 | Eddy | 342/165 |
| 4,823,132 A | 4/1989 | Platt et al. | 342/169 |
| 5,038,146 A * | 8/1991 | Troychak et al. | 342/173 |
| 5,117,230 A * | 5/1992 | Wedel, Jr. | 342/169 |
| 5,136,528 A | 8/1992 | Fordham et al. | |
| 5,150,127 A * | 9/1992 | Aw | 342/169 |
| 5,160,264 A | 11/1992 | Banura et al. | |
| 5,164,734 A * | 11/1992 | Fredericks et al. | 342/172 |
| 5,247,843 A | 9/1993 | Bryan | |
| 5,294,934 A * | 3/1994 | Matsumoto | 342/173 |
| 5,440,316 A | 8/1995 | Podgorski et al. | |
| 5,592,850 A | 1/1997 | Rowan | |
| 5,809,087 A * | 9/1998 | Ashe et al. | 342/165 |
| 5,892,479 A * | 4/1999 | Mills et al. | 342/172 |
| 6,067,042 A * | 5/2000 | Lee | 342/172 |
| 6,114,985 A * | 9/2000 | Russell et al. | 342/169 |
| 6,133,868 A * | 10/2000 | Butler et al. | 342/174 |
| 6,249,248 B1 | 6/2001 | Kitayoshi | 342/360 |
| 6,295,032 B1 | 9/2001 | Podgorski | 343/703 |
| 6,298,318 B1 | 10/2001 | Lin | |
| 6,346,909 B1 * | 2/2002 | Johnson et al. | 342/169 |
| 6,492,939 B1 * | 12/2002 | Fredericks et al. | 342/172 |
| 6,498,583 B1 | 12/2002 | Tsai et al. | 342/169 |
| 6,515,616 B1 * | 2/2003 | Kuplicki | 342/174 |
| 6,700,531 B2 * | 3/2004 | Abou-Jaoude et al. | 342/165 |
| 6,741,205 B2 * | 5/2004 | Nagasaku | 342/174 |
| 6,950,057 B1 * | 9/2005 | Mussell et al. | 342/170 |
| 7,145,504 B1 * | 12/2006 | Newberg et al. | 342/169 |
| 7,212,152 B2 * | 5/2007 | Nagasaku | 342/174 |
| 2003/0179380 A1 | 9/2003 | Yafuso | |
| 2004/0234076 A1 | 11/2004 | Agostini | |

* cited by examiner

ELECTRONIC TARGET POSITION CONTROL AT MILLIMETER WAVE FOR HARDWARE-IN-THE-LOOP APPLICATIONS

BACKGROUND OF THE INVENTION

1. Field of the Invention

The present invention pertains to hardware-in-the-loop testing of millimeter wave tracking and guidance systems and, more particular, to a technique for controlling the position of a simulated target for such testing.

2. Description of the Related Art

A need of great importance in military and some civilian remote sensing operations is the ability to quickly detect and identify objects, frequently referred to as "targets," in a "field of regard." A common problem in military operations, for example, is to detect and identify targets, such as tanks, vehicles, guns, and similar items, which have been camouflaged or which are operating at night or in foggy weather. It is important in many instances to be able to distinguish reliably between enemy and friendly forces. As the pace of battlefield operations increases, so does the need for quick and accurate identification of potential targets as friend or foe and as a target or not.

Remote sensing techniques for identifying targets have existed for many years. For instance, in World War II, the British developed and utilized radio detection and ranging ("RADAR") systems for identifying the incoming planes of the German Luftwaffe. RADAR uses radio waves to locate objects at great distances even in bad weather or in total darkness. Sound navigation and ranging ("SONAR") has found similar utility and application in environments where signals propagate through water, as opposed to the atmosphere. While RADAR and SONAR have proven quite effective in many areas, they are inherently limited by a number of factors. For instance, RADAR is limited because of its use of radio frequency signals and the size of the resultant antennas used to transmit and receive such signals. Sonar suffers similar types of limitations. Thus, alternative technologies have been developed and deployed.

Some of these alternative technologies are optical in nature. One such alternative technology is laser detection and ranging ("LADAR"). Similar to RADAR systems, which transmit and receive radio waves to and reflected from objects, LADAR systems transmit laser beams and receive reflections from targets. Because of the short wavelengths associated with laser beam transmissions, LADAR data exhibits much greater resolution than RADAR data. Typically, a LADAR system creates a three-dimensional ("3-D") image in which each datum, or "pixel", comprises an (x,y) coordinate and associated range for the point of reflection. However, some optical systems operate two-dimensionally. Optical systems can be used for automatic target recognition, targeting, direction finding, and other, similar tasks.

Such tracking and guidance systems are typically expensive to design and build, even in prototype. Furthermore, they are usually designed to operate over relatively long distances and frequently at high speeds. New designs are therefore tested by simulation. Hardware-in-the-loop ("HWIL") simulations for RF missile seeker guidance verification requires simulated target angle motion in synchronization with the missile motion simulator in order to evaluate intercept performance. Target angle motion control has classically been achieved with either mechanical x-y positioners or exotic electronic implementations to achieve the desired results. Mechanical positioners are costly and have limited coverage and acceleration, high losses, poor phase stability, and low reliability. Classical exotic electronic techniques use amplitude and phase control at lower frequencies with up-conversion to millimeter wave ("MMW") for each element. This is expensive and requires extensive calibration.

More particularly, missile tracking and guidance systems are typically tested during development in an anechoic chamber. The guidance system prototype is placed at one end of the anechoic chamber. The wall of the chamber at the opposite end is honeycombed with antennas, sometimes referred to as "horns." The antennas are controlled in groups of three referred to as "triads," to radiate energy in a pattern that will simulate the presence of a target. More particularly, each horn of the triad radiates a signal, and the three signals interfere with each other at a desired point. The desired point is in the two-dimensional, triangular space defined by the triad. To simulate movement of the target within the triad, the radiated energy can be controlled to "move" the simulated target within the triad. Movement can be simulated outside of a given triad, but within the honeycomb pattern as a whole, by forming new triads and controlling their radiated energy similarly. Because the simulated target's position is defined within the triad whose signal's generate it, the target cannot be simulated at a position outside the physical dimensions of the honeycomb of antennas.

The present invention is directed to resolving, or at least reducing, one or all of the problems mentioned above.

SUMMARY OF THE INVENTION

The invention includes, in its various aspects and embodiments, a method and apparatus for use in controlling a simulated target position in a millimeter wave, hardware-in-the-loop system. The apparatus comprises a pair of horns and a conditioning circuit. The conditioning circuit is capable of generating a pair of output millimeter wave signals, each to be broadcast from a respective one of the horns, the output millimeter wave signals being out of phase by a predetermined amount, and capable of attenuating at least one of the output millimeter wave signals to control the position of the simulated target in a first and a second region. The method comprises generating a pair of output millimeter wave signals that are out of phase by a predetermined amount; attenuating at least one of the output millimeter wave signals to control the position of the simulated target in a first and a second region; and broadcasting the millimeter wave signals. The invention can be extended to four horns arranged in a quad configuration to control position in two dimensions and can be extended to a test array comprising a plurality of horn pairs and horn quads.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
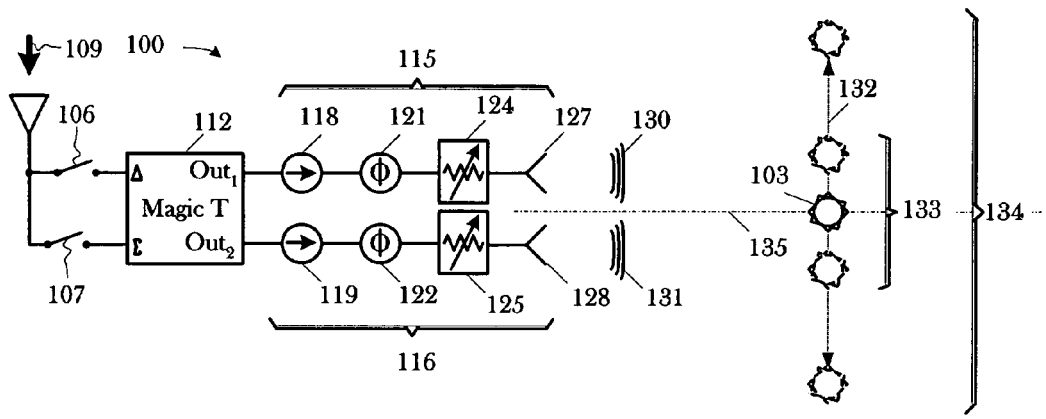
FIG. 1 diagrams an apparatus for controlling the position of a simulated target for millimeter wave, hardware-in-the-loop testing of a guidance and tracking system in accordance with the present invention.

FIG. 1 diagrams an apparatus 100 for controlling the position of a simulated target 103 for millimeter wave, hardware-in-the-loop testing of a guidance and tracking system (not shown). The apparatus 100 includes a pair of electronically controlled switches 106, 107 that control the input of a millimeter wave signal 109 to an electronic component known to the art as a "Magic T waveguide" 112. The Magic T waveguide 112 includes two input ports $\Delta$, $\Sigma$ and two output ports $Out_1$ and $Out_2$. The output ports $Out_1$, $Out_2$ feed two respective output channels 115, 116. Each output channel 115, 116 comprises a respective isolator 118, 119, fixed phase shifter 121, 122, and variable attenuator 124, 125. Each output channel 115, 116 feeds a respective horn 127, 128.

The switches 106, 107, Magic T waveguide 112, isolators 118, 119, and fixed phase shifters 121, 122 comprise a conditioning circuit 129. The conditioning circuit 129 conditions the input signal 109 to generate a pair of output millimeter wave signals 130, 131, each to be broadcast from a respective one of the horns 127,128, that are out of phase by a predetermined amount. The conditioning circuit 109 is furthermore capable of attenuating at least one of the output millimeter wave signals 130, 131 to control the position of the simulated target 103 in a manner described more fully below. Note that the conditioning circuit is, by way of example and illustration, but one means by which this may be accomplished and alternative embodiments may employ alternative means.

Each of the horns 127, 128 broadcasts a millimeter wave signal 130, 131. The physical characteristics of the millimeter wave signals 130, 131 are controlled in accordance with the present invention so that the millimeter wave signals 130, 131 interfere with one another at a predetermined spot. This predetermined spot is the location of the simulated target 103. The present invention controls the location of the simulated target 103 in a plane in the direction indicated by the arrow 132. Whether this direction is vertical or horizontal will depend on the orientation of the horns 127, 128 relative to the earth's gravity. In FIG. 1, the orientation is such that the horns 127, 128 control position in a vertical direction. Note that the direction may also be on a diagonal between horizontal and vertical.

In operation, an input signal 109 is externally generated in accordance with conventional practice. The switches 106, 107 control whether the input signal 109 is input to the Magic T waveguide 112 through the $\Delta$ ("delta", or "difference") port or the $\Sigma$ ("sigma", or "sum") port. To achieve motion of the simulated target 103 through a first, or "inside", region 133, the input signal 109 is input to the Magic T waveguide 112 through the $\Delta$ port. To achieve motion through a second, or "outside" region 134, the input signal is input to the Magic T waveguide 112 through the $\Sigma$ port. If motion in both inside and outside regions 133, 134 is desired, then the switches 106, 107 are opened and closed to shuttle the input signal 109 between the $\Delta$, $\Sigma$ input ports as needed. Note that the functionality of the Magic T waveguide 112 can be alternatively implemented in other hardware.

Figure 2A:
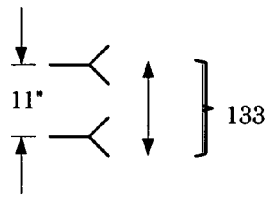
FIG. 2A-FIG. 2B illustrate signal considerations for the inside region in FIG. 1, assuming a separation of 11" between the horns.
Figure 3A:
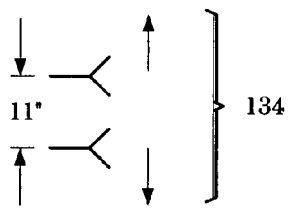
FIG. 3A-FIG. 3B illustrate signal considerations for the outside region in FIG. 1, assuming the same separation of 11" between the horns.
Figure 2B:
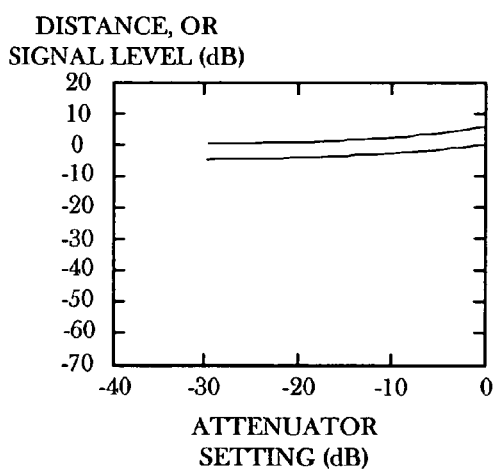
Figure 3B:
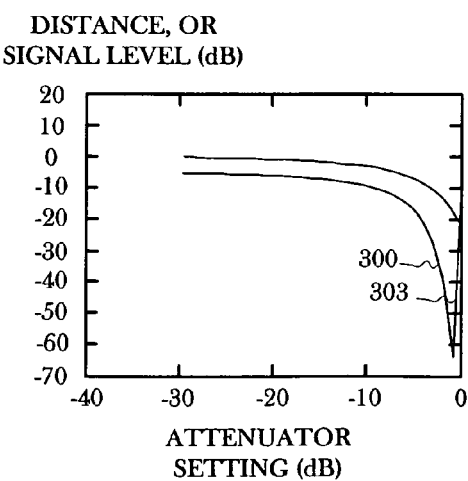

The precise dimensions of the regions 133, 134 and the demarcation between each of them will be an implementation specific detail. FIG. 2A-FIG. 2B illustrate signal considerations for the inside region 133, assuming a separation of 11" between the horns 127, 128. FIG. 3A-FIG. 3B illustrate signal considerations for the outside region 134, assuming the same separation of 11" between the horns 127, 128. Note the steeply sloped portions 300, 303 of the curve 306 in FIG. 3B. It is in these portions 300, 303 that operation is in the inside region 133 and the input to the Magic T waveguide 112 should be through the $\Delta$ port. Otherwise, operation is in the outside region 134 and input should be through the $\Sigma$ port. Note that, in the illustrated embodiment, the inside range 133 is 0±5" from the center 135 and the outside range 134 is +5.5" to +68" and −5.5" to −68" with approximately 15 dB signal loss.

Returning to FIG. 1, regardless of whether the input signal 109 is input to the $\Delta$ port or the $\Sigma$ port, the Magic T waveguide 112 will output a signal on both the $Out_1$ and $Out_2$ ports. If the input signal 109 is input to the $\Sigma$ port, then the Magic T waveguide 112 splits it into two signals (not shown) that are of equal amplitude and are in phase (i.e., 0° out of phase). If the input signal 109 is input to the $\Delta$ port, then the Magic T waveguide 112 splits it into two signals (also not shown) that are of equal amplitude but that are approximately 180° out of phase. The second split signal is, in the illustrated embodiment, actually 176°. The amount out of phase sets the maximum off-axis angle (or position) and the maximum signal loss at that angle. For example, in the limit for far field conditions, a 180° offset results in complete signal cancellation in the sum channel of the receiving system, which would have an indicated angle of +/− infinity. In either case, one of the split signals is then output by the Magic T waveguide 112 to the first output channel 115 through the $Out_1$ port and the other is output to the second output channel 115 through the $Out_2$ port.

As those in the art having the benefit of this disclosure will appreciate, the fixed phase shifters 121, 122 and the attenuators 124, 125 will reflect a portion of the split signals back up the output channels 115, 116 toward the Magic T waveguide 112. These reflections are sometimes referred to as "backscatter." The isolators 118, 119 block such backscatter, thereby "isolating" the Magic T waveguide 112 and other upstream components from the backscatter. This technique is well known and commonly employed in the art, and any suitable technique known to the art may be used here.

The fixed phase shifters 121, 122 are selected so as to achieve the desired phase shift between the unattenuated millimeter wave signals 130, 131. The phase shift controls the maximum of the outside range 134. The illustrated embodiment seeks to maximize the outside range 134, and so seeks a phase shift of approximately 180°. An actual phase shift of 180° would yield a theoretically infinite maximum, which is not useful. Thus, the term "approximately" is a recognition of this physical reality that 180° is a theoretical maximum without utility and that this particular embodiment seeks to impose a maximum range with a phase shift approaching 180°. Thus, the fixed phase shifters 121, 122 of the illustrated embodiment are selected to impose a phase shift of 0° and approximately 180°, respectively.

Note, however, that such a wide range for the simulated target 103 is not necessary to the practice of the invention. Alternative embodiments may desire a lesser range outside the dimensions of the test array, and could use a smaller phase shift, e.g., a phase shift of 145°. The fixed phase shifters 121, 122 in these embodiments might impose a phase shift of 0° and 145°, for example. Accordingly, the practice of the present invention only requires that a phase shift of a predetermined amount be effected.

The operation of the switches 106, 107 and the voltage variable attenuators 124, 125 are then controlled to determine the position of the simulated target 103. As noted above, the switches 106, 107 are operated to determine whether the position of the simulated target is in the inside range 133 or in the outside range 134. Within the inside range 133 and the outside range 134, however, the operation of the voltage variable attenuators 124, 125 control the position. More particularly, the relative signal amplitude and phase difference between the two output millimeter wave signals 130, 131 results in a coherent phase front distortion that emulates a point source phase front at the desired angle.

For example, when only one of the millimeter wave signals 130, 131 radiates, the simulated target 103 will appear at the horn 127, 128 from which the millimeter wave signal 130, 131 is radiating. Accordingly, assume that the millimeter wave signal 130 is unattenuated by the variable attenuator 124 and that the millimeter wave signal 131 is completely attenuated by the variable attenuator 125 (i.e., the amplitude of the millimeter wave signal 131 is 0). The simulated target 103 will then be positioned at the horn 127. As the relative amplitude of the millimeter wave signal 131 is increased (i.e., the attenuation is reduced), the simulated target 103 will move in angle out to the limit where the maximum (but not complete) cancellation occurs. This is because the coherent interference arising from the millimeter wave signal 131 creates a phase slope across the seeker antenna (not shown) which emulates the phase front of a point source at the desired (new) angle. Note that the "relative amplitude" is relative to the amplitude of the other millimeter wave signal.

Figure 4:
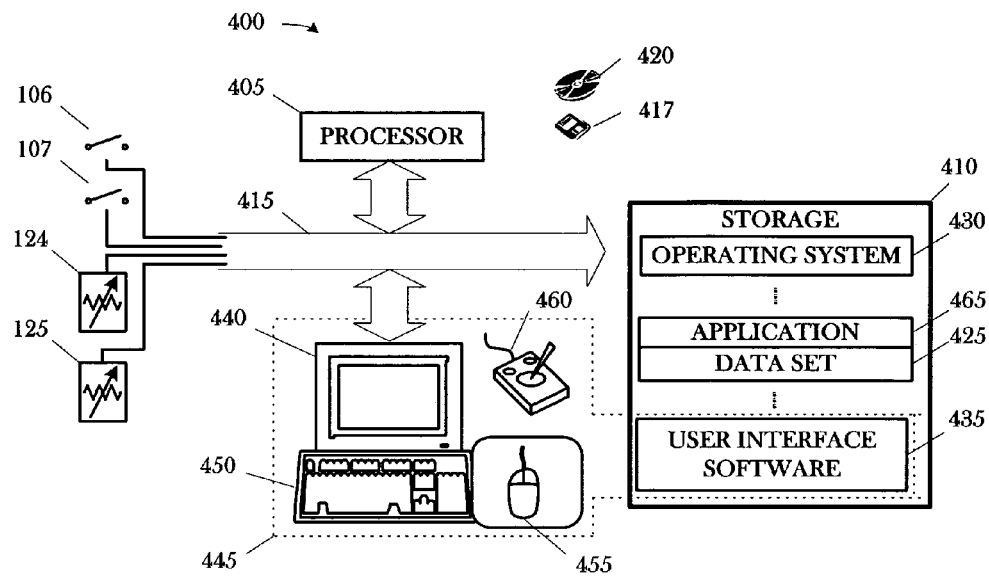
FIG. 4 shows selected portions of the hardware and software architecture of a computing apparatus such as may be employed in some aspects of the present invention.

FIG. 4 shows selected portions of the hardware and software architecture of a computing apparatus 400 such as may be employed in some aspects of the present invention. The computing apparatus 400 includes a processor 405 communicating with storage 410 over a bus system 415. The storage 410 may include a hard disk and/or random access memory ("RAM") and/or removable storage such as a floppy magnetic disk 417 and an optical disk 420.

The storage 410 is encoded with a data set 425. The data set 425 contains information regarding the performance of the tracking and guidance system (not shown) under test and/or information regarding the positions of the simulated target 103, shown in FIG. 1, during the test. The storage 410 is also encoded with an operating system 430, user interface software 435, and an application 465. The user interface software 435, in conjunction with a display 440, implements a user interface 445. The user interface 445 may include peripheral I/O devices such as a keypad or keyboard 450, a mouse 455, or a joystick 460. The processor 405 runs under the control of the operating system 430, which may be practically any operating system known to the art.

The application 465 is invoked by the operating system 430 upon power up, reset, or both, depending on the implementation of the operating system 430. The application 465, when invoked, controls the position of the simulated target 103 during the test. Typically, this will include a number of positions to test the efficacy of the tracking and guidance system. Alternatively, the user may also invoke the application in conventional fashion through the user interface 445. As noted above, the switches 106, 107 and the attenuators 124, 125, all first shown in FIG. 1, are controlled per the needs of the test. The application 465 executes the test, and therefore generates the control signals therefore over the bus system 415, as is conceptually depicted in FIG. 4. Note that the computing apparatus is, by way of example and illustration, but one means for controlling the input signal to the conditioning circuit and for controlling the attenuation of the output millimeter wave signals, and that alternative embodiments may employ alternative means.

Note that some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 5:
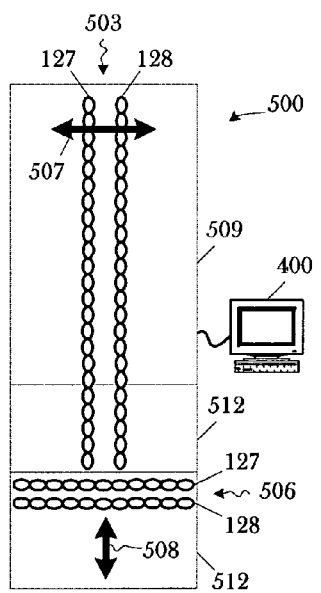
FIG. 5 conceptually illustrates a test array employing the apparatus of FIG. 1.

In practice, a test array will comprise a plurality of pairs of horns 127, 128. Consider, for instance, the exemplary test array 500 in FIG. 5. The test array 500 comprises a computing apparatus 400, a vertical column 503 of paired horns 127, 128 (only one pair indicated) and a horizontal row 506 of paired horns 127, 128 (only one pair indicated). The paired horns 127, 128 in the column 503 control the position of the simulated target 103 in a horizontal direction indicated by the arrow 507. The paired horns 127, 128 in the row 506 control the position of the simulated target 103 in a vertical direction indicated by the arrow 508. The motion limit for the simulated target 103, shown in FIG. 1, is indicated by the box 509 in ghosted lines. The limit of the interference extent is indicated by the boxes 512 in ghosted lines.

Figure 6:
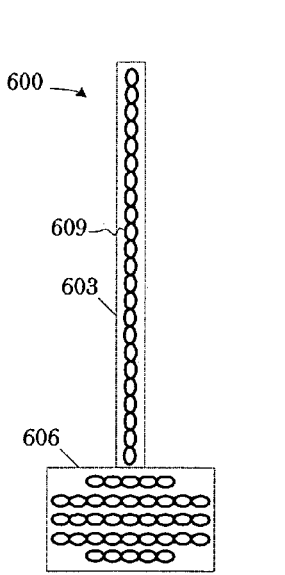
FIG. 6 conceptually illustrates a conventional test array.
Figure 7:
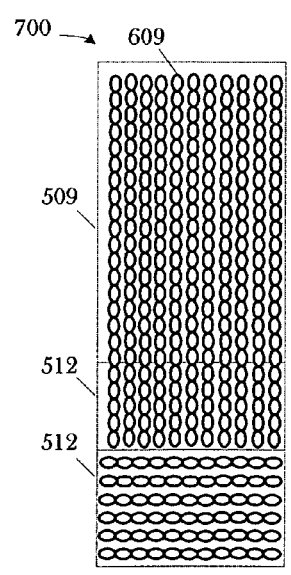
FIG. 7 conceptually illustrates a conventional test array capable of achieving the same effect in simulated target positioning as the test array of FIG. 5; and FIG. 8A

Compare this to that obtainable in conventional practice. FIG. 6 illustrates an exemplary test array 600 and the target motion limit 603 and interference extent limit 606 for the horns 609 (only one indicated) in the particular array. Thus, to achieve a motion limit 509 for the simulated target 103 and an interference extent limit 512 using a conventional approach would require, as is shown in FIG. 7, and array 700 of horns 609 (only one indicated). Note the difference in the number of horns between the test array 500 in FIG. 5 and the test array 700 in FIG. 7.

Figure 8A:
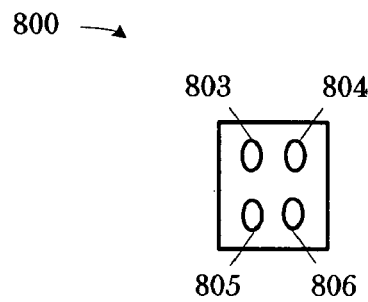
-FIG. 8B illustrates an alternative embodiment in which the simulated target position is controlled in two dimensions, as opposed to one dimension in the embodiment of FIG. 1.
Figure 8B:
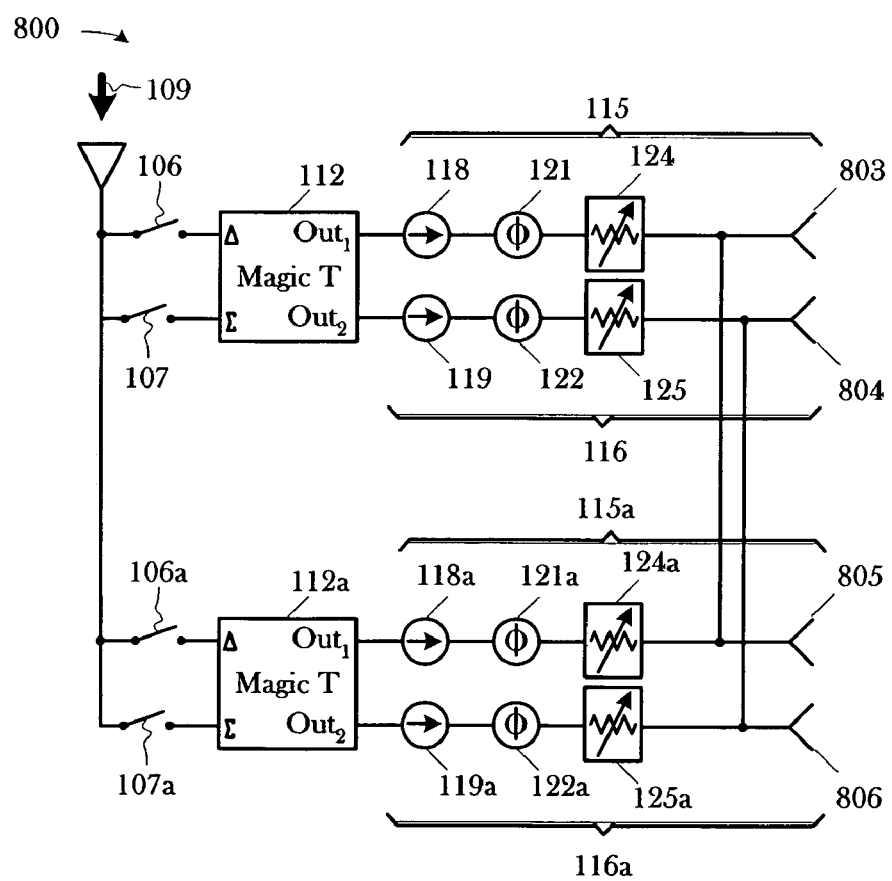

The present invention can also be extended to control position in two dimensions using a quad configuration. FIG. 8A-FIG. 8B illustrate one such embodiment in which a quad configuration 800 comprises four horns 803-806. The quad configuration 800 includes two pairs of electronically controlled switches 106, 107 and that 106a, 107a control the input of a millimeter wave signal 109 to two Magic T waveguides 112, 112a. Each Magic T waveguide 112 includes two input ports Δ, Σ and two output ports Out$_1$ and Out$_2$. The output ports Out$_1$, Out$_2$ feed respective output channels 115, 116 and 115a, 116a. Each output channel 115, 116 and 115a, 116a comprises a respective isolator 118, 119 and 118a, 119a, a fixed phase shifter 121, 122 and 121a, 122a, and a variable attenuator 124, 125 and 124a, 125a. Each output channel 115, 116 feeds a respective horn 127, 128.

Thus, in accordance with the present invention, electronic target motion control is achieved in either one or two dimensions using commercially available hardware in a unique configuration that provides robust, efficient angle motion control at millimeter wavelengths for hardware-in-the-loop applications. The technique achieves continuous angle motion requiring only an electronically controlled attenuator in conjunction with fixed passive components. More particularly, continuous position control only requires a voltage variable attenuator. Fixed phase shifters are set to near cancellation region for Σ port. Angle coverage is determined by element spacing, control attenuation range, and maximum desired signal loss. It achieves a broadband solution with limited calibration requirements. It reduces costs by using commercially available, off the shelf components and reduced hardware requirements. It also reduces facility requirements because the target position can be simulated outside the dimensions of the test array. The target position can even be simulated beneath the floor of the anechoic chamber in which the test array is deployed.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus for use in controlling a simulated target position in a millimeter wave, hardware-in-the-loop system, comprising:
    a pair of horns; and
    a conditioning circuit capable of generating a pair of output millimeter wave signals, each to be broadcast from a respective one of the horns, the output millimeter wave signals being out of phase by a predetermined amount, and capable of attenuating at least one of the output millimeter wave signals to control the position of the simulated target in a first and a second region.

2. The apparatus of claim 1, wherein the conditioning circuit includes:
    a waveguide including a pair of input ports and a pair of output ports, the waveguide splitting an input signal into the millimeter wave signals, each millimeter wave signal being output on a respective one of the output ports;
    a plurality of switches controlling the input of the input signal to the waveguide between the input ports;
    a pair of output channels, each comprising:
        an isolator for protecting the waveguide from backscatter generated in the output channel;
        a fixed phase shifter for shifting the respective millimeter wave signal by a fixed amount; and
        a variable attenuator capable of attenuating the respective phase-shifted millimeter wave signal.

3. The apparatus of claim 1, wherein the conditioning circuit comprises means for conditioning an input signal to generate the output millimeter wave signals and attenuating at least one of the millimeter wave signals to control the position of the simulated target.

4. The apparatus of claim 3, wherein the conditioning and attenuating means includes:
    a waveguide including a pair of input ports and a pair of output ports, the waveguide splitting an input signal into the millimeter wave signals, each millimeter wave signal being output on a respective one of the output ports;
    a plurality of switches controlling the input of the input signal to the waveguide between the input ports;
    a pair of output channels, each comprising:
        an isolator for protecting the waveguide from backscatter generated in the output channel;
        a fixed phase shifter for shifting the respective millimeter wave signal by a fixed amount; and
        a variable attenuator capable of attenuating the respective phase-shifted millimeter wave signal.

5. The apparatus of claim 1, further comprising:
    means for controlling the input signal to the conditioning circuit; and means for controlling the attenuation of the output millimeter wave signals.

6. The apparatus of claim 5, wherein the input control means and the attenuation control means comprise a computing apparatus.

7. The apparatus of claim 1, wherein the output millimeter wave signals are out of phase by approximately 180°.

8. The apparatus of claim 7, wherein the output millimeter wave signals are out of phase by 176°.

9. The apparatus of claim 1, further comprising:
a second pair of horns; and
a second conditioning circuit capable of generating a second pair of output millimeter wave signals, each to be broadcast from a respective one of the second pair of horns, the second output millimeter wave signals being out of phase by a predetermined amount relative to one another and to the first pair of output millimeter wave signals, and capable of attenuating at least one of the second pair of output millimeter wave signals to control the position of the simulated target in a first and a second region in a second dimension.

10. An apparatus for use in controlling a simulated target position in a millimeter wave, hardware-in-the-loop system, comprising:
a first pair of horns;
a second pair of horns; and
a conditioning circuit capable of generating a first pair and a second pair of output millimeter wave signals, each to be broadcast from a respective one of the first and second pair of horns, each pair of output millimeter wave signals being out of phase by a predetermined amount relative to one another and to the other pair of output millimeter wave signals, and capable of attenuating at least one of the output millimeter wave signals to control the position of the simulated target in a first and a second region in a second dimension.

11. The apparatus of claim 10, further comprising:
means for controlling the input signal to the conditioning circuit; and
means for controlling the attenuation of the output millimeter wave signals.

12. A millimeter wave, hardware-in-the-loop test array, comprising:
a plurality of paired horns;
a plurality of conditioning circuits, each conditioning circuit capable of generating a pair of output millimeter wave signals for a respective set of paired horns, the paired output millimeter wave signals being out of phase by a predetermined amount, and capable of attenuating at least one of the paired output millimeter wave signals to control the position of the simulated target in a first and a second region;
means for controlling the input signal to the conditioning circuits; and
means for controlling the attenuation of the output millimeter wave signals.

13. The apparatus of claim 12, wherein at least one conditioning circuit includes:
a waveguide including a pair of input ports and a pair of output ports, the waveguide splitting an input signal into the millimeter wave signals, each millimeter wave signal being output on a respective one of the output ports;
a plurality of switches controlling the input of the input signal to the waveguide between the input ports;
a pair of output channels, each comprising:
an isolator for protecting the waveguide from backscatter generated in the output channel;
a fixed phase shifter for shifting the respective millimeter wave signal by a fixed amount; and
a variable attenuator capable of attenuating the respective phase-shifted millimeter wave signal.

14. The apparatus of claim 12, wherein the input control means and the attenuation control means comprise a computing apparatus.

15. The apparatus of claim 12, wherein the paired horns are paired to form quads.

16. A method for controlling a simulated target position in a millimeter wave, hardware-in-the-loop system, comprising:
generating a pair of output millimeter wave signals that are out of phase by a predetermined amount;
attenuating at least one of the output millimeter wave signals to control the position of the simulated target in a first and a second region; and
broadcasting the millimeter wave signals.

17. The method of claim 16, wherein generating the output millimeter wave signals includes controlling the input to a waveguide.

18. The method of claim 16, wherein the output millimeter wave signals are out of phase by approximately 180°.

19. The method of claim 18, wherein the output millimeter wave signals are out of phase by 176°.

20. The method of claim 16, further comprising:
generating a second pair of output millimeter wave signals that are out of phase by a second predetermined amount;
attenuating at least one of the second pair of output millimeter wave signals to control the position of the simulated target in a third and a fourth region in a second dimension; and
broadcasting the second pair of millimeter wave signals.

21. An apparatus for use in controlling a simulated target position in a millimeter wave, hardware-in-the-loop system, comprising:
means for generating a pair of output millimeter wave signals that are out of phase by a predetermined amount;
means for attenuating at least one of the output millimeter wave signals to control the position of the simulated target in a first and a second region; and
means for broadcasting the millimeter wave signals.

22. The apparatus of claim 21, wherein generating means includes means for controlling the input to a waveguide.

23. The apparatus of claim 21, wherein the output millimeter wave signals are out of phase by approximately 180°.

24. The apparatus of claim 23, wherein the output millimeter wave signals are out of phase by 176°.

25. The apparatus of claim 21, further comprising:
means for generating a second pair of output millimeter wave signals that are out of phase by a second predetermined amount;
means for attenuating at least one of the second pair of output millimeter wave signals to control the position of the simulated target in a third and a fourth region in a second dimension; and
means for broadcasting the second pair of millimeter wave signals.

* * * * *